US012463346B2

(12) United States Patent
Mallegol et al.

(10) Patent No.: US 12,463,346 B2
(45) Date of Patent: Nov. 4, 2025

(54) ANTENNA SYSTEM COMPRISING AN ANTENNA AND A PASSIVE DEVICE FOR ANGULAR DEFLECTION OF A MAIN RADIATION LOBE OF THE ANTENNA

(71) Applicant: THALES, Meudon (FR)

(72) Inventors: Stéphane Mallegol, Brest (FR); Christian Renard, Elancourt (FR)

(73) Assignee: THALES, Meudon (FR)

( * ) Notice: Subject to any disclaimer, the term of this patent is extended or adjusted under 35 U.S.C. 154(b) by 131 days.

(21) Appl. No.: 18/406,127

(22) Filed: Jan. 6, 2024

(65) Prior Publication Data

US 2024/0243483 A1 Jul. 18, 2024

(30) Foreign Application Priority Data

Jan. 13, 2023 (FR) ...................................... 2300339

(51) Int. Cl.

*H01Q 15/08* (2006.01)
*H01Q 1/42* (2006.01)

(Continued)

(52) U.S. Cl.

CPC ............... *H01Q 15/08* (2013.01); *H01Q 1/42* (2013.01); *H01Q 15/10* (2013.01); *H01Q 19/08* (2013.01); *H01Q 13/02* (2013.01)

(58) Field of Classification Search

CPC .......... H01Q 1/42; H01Q 13/02; H01Q 15/08; H01Q 15/10; H01Q 19/06; H01Q 19/08

See application file for complete search history.

(56) References Cited

U.S. PATENT DOCUMENTS

2014/0176377 A1* 6/2014 Merlet .................. H01Q 15/10 343/753
2018/0294561 A1 10/2018 Hayes et al.

(Continued)

FOREIGN PATENT DOCUMENTS

CN 103682665 B 5/2018
EP 4148902 A1 * 3/2023 .............. H01Q 9/27

(Continued)

OTHER PUBLICATIONS

Kim Yeonju et al: "Lightweight 3D-Printed Fractal Gradient-Index Lens Antenna with Stable Gain Performance" , Fractal and Fractional, vol. 6, No. 10, Sep. 29, 2022 (Sep. 29, 2022), p. 551.

(Continued)

*Primary Examiner* — Daniel Munoz
(74) *Attorney, Agent, or Firm* — Soquel Group LLC

(57) ABSTRACT

An antenna system includes an antenna and a passive device for angular deflection of a main radiation lobe of the antenna, characterized in that the device consists of a lens, said lens having a constant thickness and having a progressive relative permittivity between an inner edge of the lens located on the side of the geometric center of the antenna and an outer edge of the lens located on the side of a periphery of the antenna, the profile of the relative permittivity as a function of distance to the geometrical center of the antenna being adapted such that the lens deflects the main radiation lobe of the antenna by a predefined deflection angle over at least a portion of an operating frequency band of the antenna.

18 Claims, 6 Drawing Sheets

(51) Int. Cl.
*H01Q 15/10* (2006.01)
*H01Q 19/08* (2006.01)
*H01Q 13/02* (2006.01)

(56) References Cited

U.S. PATENT DOCUMENTS

| | | | | |
|---|---|---|---|---|
| 2021/0126374 | A1* | 4/2021 | Mallegol | H01Q 9/27 |
| 2022/0109245 | A1 | 4/2022 | Yang | |

FOREIGN PATENT DOCUMENTS

| | | | |
|---|---|---|---|
| FR | 3003702 | A1 | 9/2014 |
| JP | 2002171122 | A | 6/2002 |
| WO | 2021181872 | A1 | 9/2021 |

OTHER PUBLICATIONS

Poyanco Jose-Manuel et al: "Cost-effective wideband dielectric planar lens antenna for millimeter wave applications", Scientific Reports, [Online] vol. 12, No. 1, Mar. 10, 2022 (Mar. 10, 2022). : URL:https://www.nature.com/articles/s41598, pp. 1-10; figures 1-12.
English Abstract for JP Publication No. 2002171122, Jun. 14, 2002.
FR 2300339, INPI Rapport de Recherche Preliminaire, Sep. 22, 2023, 3 pages.

* cited by examiner

ANTENNA SYSTEM COMPRISING AN ANTENNA AND A PASSIVE DEVICE FOR ANGULAR DEFLECTION OF A MAIN RADIATION LOBE OF THE ANTENNA

CROSS-REFERENCE TO RELATED APPLICATIONS

This application is a U.S. non-provisional application claiming the benefit of French Application No. 23 00339, filed on Jan. 13, 2023, which is incorporated herein by reference in its entirety.

TECHNICAL FIELD OF THE INVENTION

The field of the invention is the field of antenna systems which may operate in transmission or reception, and more particularly the field of antenna systems equipped with a passive device for angular deflection of the main radiation lobe of at least one of the antennas of the antenna system.

BACKGROUND OF THE INVENTION

It is sometimes necessary to associate an antenna with an angular deflection device of the main lobe thereof, in order to achieve an electromagnetic decoupling between the antenna and an antenna adjacent to the antenna system, so as to achieve an electromagnetic decoupling between the antenna and the carrier structure, or in order to meet a need for local attenuation of the electric field in order to improve the electromagnetic compatibility between the antenna and a neighboring antenna (by masking e.g. a radiation domain that is not useful operationally).

Document FR073083 discloses an antenna system including an antenna and a passive angular deflection device for the main radiation lobe of a spiral antenna.

According to the prior art, the deflection device is a lens arranged above the radiating element of the antenna so as to cover an angular sector of the antenna. The lens is made of a partially absorbing dielectric material. The lens has a thickness that varies with the distance to the geometrical center of the radiating element, in order to obtain a substantially constant angle of deviation over the operating frequency band of the antenna.

However, the frequency range over which the main lobe deflection angle is effectively constant remains quite limited. Typically, the range extends between a minimum frequency FMIN and a maximum frequency FMAX such that the ratio FMAX over FMIN is about two, i.e. at most an octave.

The above remains insufficient when the antenna is a broadband antenna such as a spiral antenna and it is sought to obtain a constant behavior over the entire operating frequency band of this antenna and not only over a limited frequency range.

Moreover, even if the angle of deviation is relatively constant over the frequency range, a degradation of the purity of the polarization is observed.

But above all, the fact that the thickness of the lens varies and is, in some places, relatively large (more particularly in the vicinity of the outer edge of the lens which corresponds to the low frequencies of the operating frequency band) does not facilitate the integration of such a passive device into an antenna system, in particular if the latter includes a protective radome. Taking into account the operation frequencies considered (e.g., between 3 GHz and 6 GHz in document FR073083), the distance between the radiating element of the antenna and the lower face of the radome is typically 2 mm at most.

SUMMARY OF THE INVENTION

The goal of the invention is thus to propose an improved passive device for angular deflection of the main lobe of a broadband antenna.

For this purpose, the subject matter of invention relates to an antenna system including an antenna and a passive device for angular deflection of a main radiation lobe of the antenna, characterized in that the device consists of a lens, the lens having a constant thickness and having a progressive relative permittivity between an inner edge of the lens located on the side of the geometrical center of the antenna and an outer edge of the lens located on the side of a periphery of the antenna, the profile of the relative permittivity as a function of distance to the geometrical center of the antenna being adapted such that the lens deflects the main radiation lobe of the antenna by a predefined deflection angle over at least a portion of an operating frequency band of the antenna.

BRIEF DESCRIPTION OF THE DRAWINGS

The invention and the advantages of the invention will be better understood upon reading the following detailed description of the two particular embodiments of the invention, given only as an illustrative example and not limited to, the description being made with reference to the enclosed drawings, wherein.

DETAILED DESCRIPTION

Figure 1:
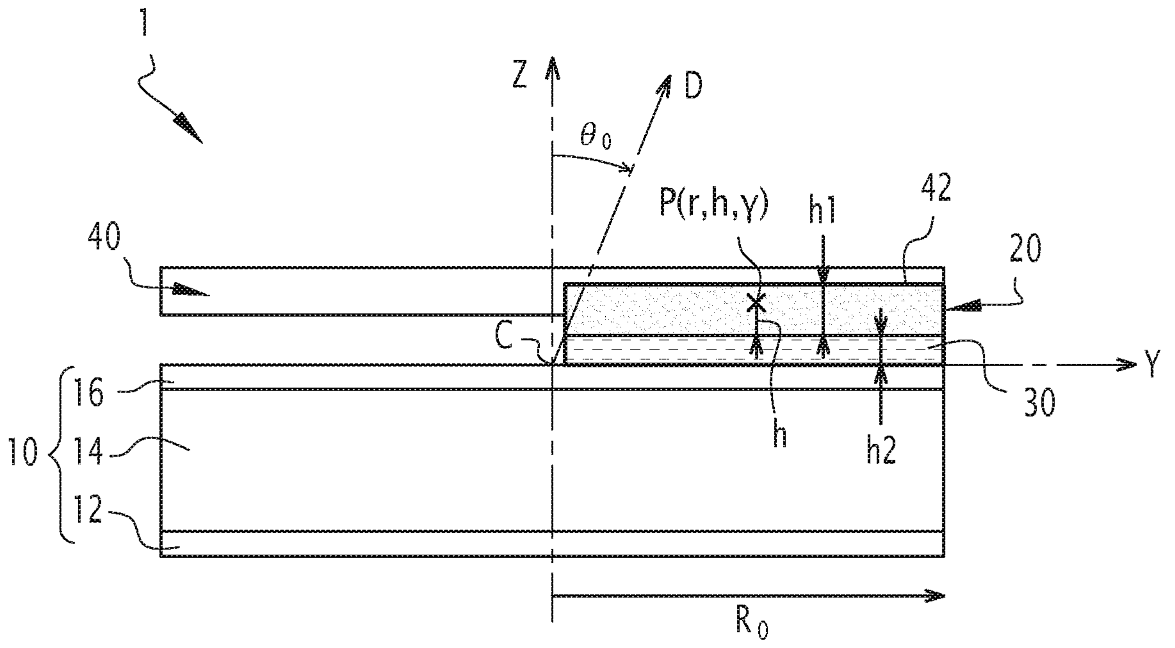
FIG. 1 is a schematic cross-sectional view of a first embodiment of an antenna system according to the invention including a single broadband sinuous antenna and a lens.
Figure 2:
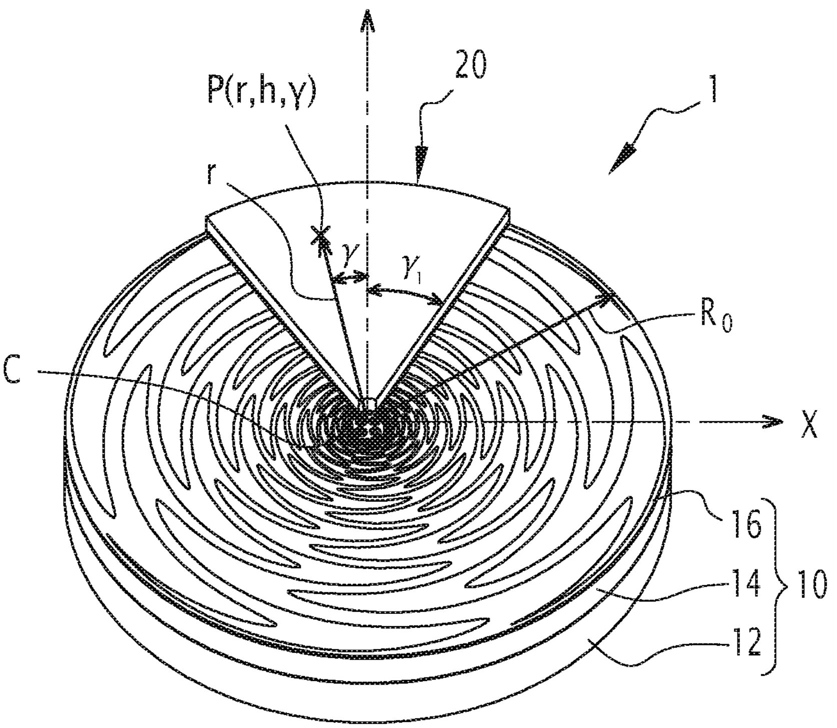
FIG. 2 is a perspective view of the antenna system shown in FIG. 1.

FIGS. 1 and 2 show an antenna system 1 according to a preferred embodiment of the invention.

The antenna system 1 includes a single antenna with a broad frequency band 10. The antenna 10 is, e.g., a sinuous antenna (as shown in FIG. 2).

In a variant, another type of planar antenna with a broad frequency band may be used, such as an Archimedean spiral, logarithmic, log-periodic antenna. In a variant, a plane antenna with a smaller frequency band may be used, such as, e.g., a “patch” antenna.

The antenna 10 includes a ground plane 12, a printed circuit 16, and a cavity 14, provided between the ground plane 12 and the printed circuit 16.

The cavity 14 may advantageously be filled with a suitable substrate, in particular for the mechanical resistance of the antenna 10.

The upper surface of the circuit 16 supports a radiating element. The constituent metal strands of the radiating element are printed on an upper surface of the printed circuit 16.

The antenna 10 preferentially forms a cylinder with radius $R_0$ and axis Z. In a variant, the antenna may also have a square shape, e.g., for an application to a square spiral antenna.

A reference trihedron is attached to antenna system 1, such that the origin thereof coincides with a geometric center C of the radiating element, the XY axes lying in the radiation plane defined by the upper surface of the printed circuit (16) and the Z axis being normal to the radiation plane (oriented towards the radiation half-space of the antenna).

The antenna system 1 includes a lens 20 as a passive angular deflection device of the main lobe of the antenna 10.

In the embodiment shown in FIG. 1, the lens 20 is bonded to the upper surface of the printed circuit 16. The adhesive film 30 forms a layer with constant thickness $h_2$ and constant relative permittivity $\varepsilon_2$, greater than one.

In a variant, the lens 20 is positioned in direct contact with the radiating element, e.g. by screwing onto the printed circuit 16.

Advantageously, the antenna system 1 includes a radome 40 intended to protect the antenna 10 and the lens 20 from external attacks. In FIG. 2, the radome has not been shown so as not to mask the lens 20. Preferentially, the radome 40 has a refined portion 42 so as to receive the upper part of the lens 20 and thereby reduce the total thickness of the antenna system 1.

The lens 20 is designed and arranged with respect to the antenna 10 so as to incline, in the YZ plane of FIG. 1, the direction D of the main radiation lobe of the antenna 10 by an angle of inclination $\theta_0$ (evaluated with respect to the Z axis).

Geometrically, the lens 20 forms an angular sector.

The lens 20 is positioned above the radiating element in the near-field radiation area of the radiating element. In a variant, the lens is positioned below the radiating element, in the cavity 14.

The lens 20 is positioned so that the apex thereof (forming the inner edge thereof) coincides substantially with the geometrical center C of the radiating element and the outer edge thereof coincides with the periphery of the antenna 10.

The lens 20 is symmetrical with respect to the bisector thereof.

The lens is positioned so that the bisector thereof coincides with the Y axis.

The half-angle of aperture of the angular sector formed by the lens 20 is denoted by $\gamma_1$.

The lens 20 has a constant thickness $h_1$. The thickness $h_1$ of the lens 20 is small compared with the wavelength $\lambda_0$ associated with the minimum frequency FMIN (i.e. the maximum wavelength) of the operating frequency band of the antenna 10.

For the lens 20 to obtain, at constant thickness, an angular deviation which is not very variable according to the operating frequency of the antenna 10 (both in the near-field area and in far-field radiation), the constituent material of the lens has progressive dielectric properties as a function of frequency.

The relative permittivity follows a changing profile between an inner edge of the lens located on the side of the geometrical center (C) of the antenna and an outer edge of the lens located on the side of a periphery of the antenna.

Figure 3:
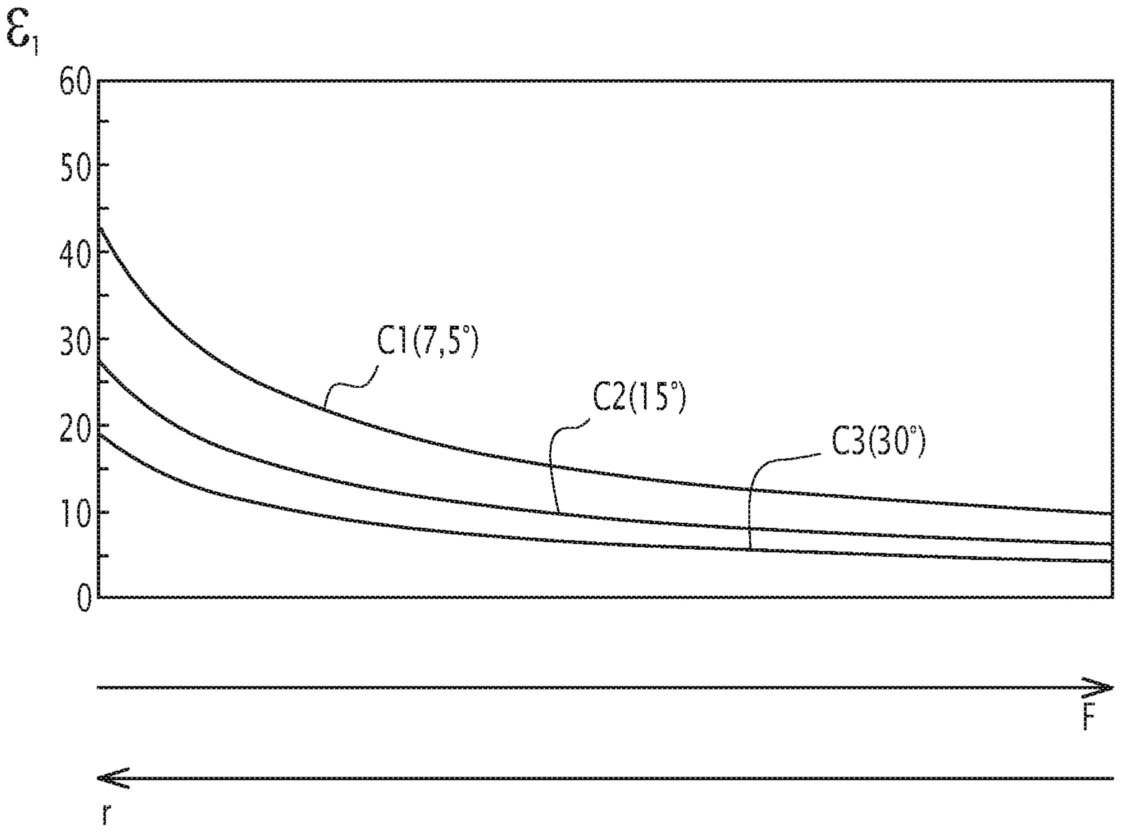
FIG. 3 is a graph representing the theoretical evolution of the relative permittivity of the lens of the antenna system shown in FIG. 1 as a function of the operating frequency of the antenna.

FIG. 3 shows three curves, C1, C2 and C3, respectively, for three values of the aperture angle of $2\gamma_1$ of the lens, 20, 7.5°, 15° and 30°, respectively. Each curve gives the profile of the relative permittivity $\varepsilon_1$ as a function of the frequency F in order to obtain, over the entire frequency band, an angular deviation of an angle of inclination $\theta_0$ equal to 10°.

For a broadband antenna, sinuous or spiral (Archimedes, logarithmic, etc.), there is a direct relationship between the operating frequency and the distance r to the Z axis of the antenna. Indeed, for this type of antenna, the portion of the radiating element that radiates mainly at a frequency, is a ring the radius of which depends on the inverse of the frequency. Thereby, in FIG. 3, each curve also gives the value of the relative permittivity $\varepsilon_1$ as a function of the distance r.

Given such relationship, the constituent dielectric material of the lens 20 has a relative permittivity profile such that the value of the permittivity decreases progressively from the periphery of the antenna (corresponding to the low operation frequencies), towards the center C of the antenna (corresponding to high operation frequencies).

The lens 20 is thereby manufactured so as to have a dielectric gradient along the distance r from the center C of the antenna.

In the cylindrical geometry of the first embodiment, polar coordinates are adapted. A point P is described by three coordinates: the distance r to the Z axis (or radius), between 0 and $R_1$; the thickness h with respect to the bottom surface of the lens, between 0 and $h_1$; and a polar angle $\gamma$ evaluated with respect to the Y axis, between $-\gamma_1/2$ and $+\gamma_1/2$.

In a variant or in combination, the lens has a dielectric gradient along the Z direction, i.e., according to the thickness h of the lens. The above may prove advantageous in particular for preventing too great a jump in relative permittivity in the vicinity of the interfaces, the adhesive film and the printed circuit on the one hand and the radome on the other hand. The fact of modifying the permittivity according to the thickness thereby provides a degree of freedom for developing an adaptation of permittivity to the interfaces.

In another variant or in combination, the lens has a dielectric gradient according to the polar angle $\gamma$. The above may prove advantageous in particular in order to have a relative permittivity close to one in the vicinity of the lateral edges of the lens and to ensure a certain continuity of such quantity.

Hereinafter, a procedure for determining the profile of the relative permittivity as a function of the distance to the center of the antenna is briefly presented. It is a question of pre-dimensioning the lens taking into account a theoretical analytical modeling, then electromagnetically simulating the behavior of the entire antenna system in order to finally refine the dimensioning.

It is possible to analytically formulate the angular deviation of the lobe as a function of a plurality of parameters. Such an analytical formulation makes it possible to write a relation of the following general form:

$$\theta_0 = f(F, \alpha, \gamma_1, h_1, h_2, \varepsilon_{reff}) \quad \text{[Eq. 1]}$$

According to equation 1, the angular deviation $\theta_0$ is a function f of the operating frequency F, the angle $\alpha$ considered in the plane perpendicular to the deviation plane (e.g. bearing angle, if the deviation is in the elevation plane), the aperture $\gamma_1$ of the angular sector formed by the lens, the thickness $h_1$ of the lens, the thickness of the $h_2$ of the layer of adhesive, and the effective relative permittivity, $\varepsilon_{ref}$.

The effective relative permittivity (complex or real) may be expressed via the equation:

$$\varepsilon_{reff} = \frac{h_1 \cdot \varepsilon_1 + h_2 \cdot \varepsilon_2}{\varepsilon_1 + \varepsilon_2} \qquad \text{(Eq. 2]}$$

From equations 1 and 2, the following equation (3) may be obtained:

$$\varepsilon_1 = f'(F, \alpha, \gamma_1, h_1, h_2, \varepsilon_2, \theta_0) \qquad \text{(Eq. 3]}$$

where the quantity of interest $\varepsilon_1$ is expressed as a function f' of the relevant parameters, in particular of the frequency F.

For a broadband antenna, a near-field radiation ring of radius r may be expressed according to equation 4:

$$r = \frac{Ac}{2\pi F} \qquad \text{(Eq. 4]}$$

where A is a constant and c is the speed of light.

Equation 4 re-injected into equation 3 yields equation 5:

$$\varepsilon_1 = f''(r, \alpha, \gamma_1, h_1, h_2, \varepsilon_2, \theta_0) \qquad \text{(Eq 5)}$$

where the quantity of interest $\varepsilon_1$ is expressed as a function f" of the relevant parameters, in particular the distance r to the Z axis of the antenna.

A person skilled in the art know possible forms for the analytical function f (and hence the functions f' and f") determined from physical models and particular approximations.

The fact of having an analytical expression makes it possible to evaluate the impact of the lens on the angular deviation of the main lobe, to estimate the theoretical deviation achievable for the relative permittivity of a given dielectric material, and to determine the relative permittivity profile needed for a stable angular deviation as a function of frequency.

Other procedures could be used for pre-dimensioning the lens, such as e.g. the effective medium theory, presented, e.g., in Joseph W. Haus's book, "Fundamentals and Applications of Nanophotonics", Woodhead Publishing, 2016, in particular Chapter 7 thereof, "Effective Medium Theories" by M. A. Vincenti and D. from Ceglia.

Following the theoretical pre-dimensioning of the electromagnetic structure of the lens, and since the analytical equations do not take into account the interaction between the lens and the antenna (nor between the lens and the radome, if any), it is appropriate, secondly, to simulate the operation of the antenna system as a whole.

Such simulation then makes it possible to electromagnetically optimize the different components of the antenna system, more particularly the lens, with the aim of rigorously obtaining the desired angular deviation over the entire operating frequency band of the antenna.

The dielectric material used to make the lens 20 preferentially has a non-dispersive permittivity as a function of frequency (i.e. the real part and the imaginary part of the relative permittivity are invariant with respect to frequency).

Preferentially still, the material used has a non-complex relative permittivity.

For example, the lens is made of a dielectric thermoplastic (PLA, ABS, PEEK, PEKK, etc.).

Advantageously, a material compatible with additive manufacturing, e.g. by 3D printing, is used. For example, the lens is produced by deposition of a molten wire FDM (Fused deposition modeling) or by SLS (Selective Laser Sintering).

In such case, the progressivity of the relative permittivity is obtained by varying the degree of filling of the material at each point P of the lens 20. Knowing that the filling is carried out by repeating a plurality of patterns, the increase in the filling ratio could consist in reducing the size of the patterns.

An advantageous way of manufacturing the lens then consists in providing a lens which results from the assembly of different sections, each section having a constant relative permittivity ε1, but adjusted so that together the different sections make it possible to find the relative permittivity profile provided for during the dimensioning.

Figure 4:
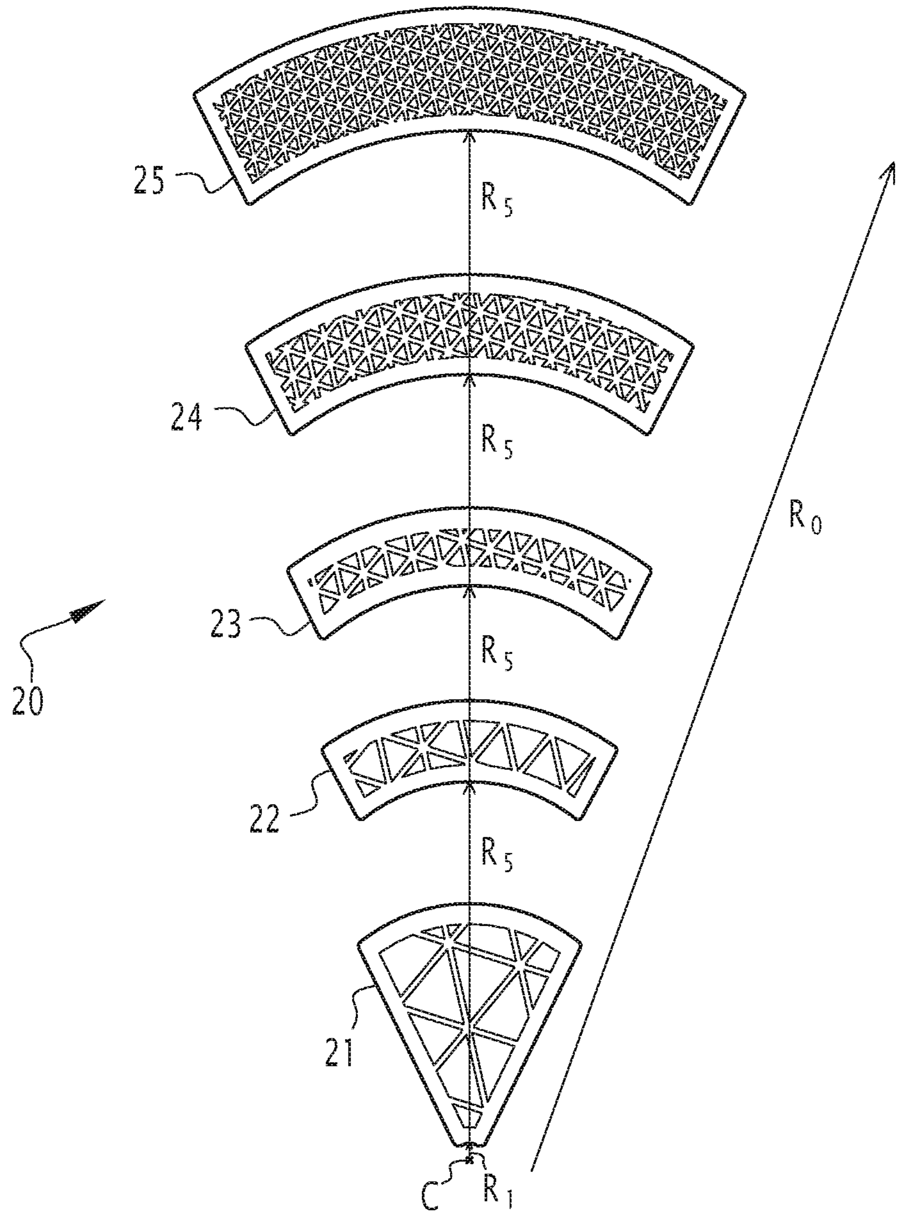
FIG. 4 illustrates a possible structure for the lens of the antenna system shown in FIG. 1, by association of elementary sections each having different relative permittivities.

As shown, e.g., in FIG. 4, the lens 20 results from the assembly of five annular sections subdividing the angular sector formed by the assembled lens: a central section 21, three intermediate sections 22, 23 and 24 and a peripheral section 25.

The inside radius of the section 21 is denoted by $R_1$, the inside radius of the section 22 (which is equal to the outside radius of the section 21) is denoted by $R_2$, the inside radius of the section 23 (which is equal to the external radius of the section 22) is denoted by $R_3$, the internal radius of the section 24 (which is equal to the external radius of the section 23) is denoted by $R_4$, and the internal radius of the section 25 (which is equal to the external radius of the section 24) is denoted by $R_5$ (knowing that the external radius of the section 25 corresponds to the radius $R_0$ of the antenna system).

The number of constituent sections of the lens 20 may be multiplied depending on the desired precision in the variation of the relative permittivity so as to approximate the initially calculated profile as best as possible.

Preferentially, in order to vary the relative permittivity from one section to another, the filling ratio is modified from one section to another. For example, in FIG. 4, the filling ratio ranges between 20% for the central section 21 and 80% for the peripheral section 25.

In the embodiment shown in FIG. 4, the filling is modified by reducing the size of the patterns. In the embodiment shown in FIG. 4, there are recessed patterns, in the present case triangles. In a variant, other patterns are conceivable (gyroid, cross, grid, hexagon, zigzag, etc.).

The side wall of a section is advantageously reinforced so as to ensure mechanical resistance (rigidity and resistance to moisture).

In a variant or in combination, the material used for each section of the lens may be different from one section to another. For example, the sections 21 and 22 may be made of an ABS plastic, whereas the sections 3, 4 and 5 may be made of a PEEK plastic.

In another variant, the recesses within the patterns, instead of being left empty (and having a relative permittivity equal to one), are filled with a second dielectric material different from the first material used to make the patterns. It is then a question of implementing a manufacturing method by bi-material 3D printing.

The second material is preferentially a low-loss dielectric material. In a variant, a dielectric material (ABS, PEEK, PEKK, etc.) is used for the patterns and is enriched with carbon (ABS ESD, PEEK ESD, PEKK ESD, etc.) for filling the patterns.

If it is desired to produce a lens having an orthoradial gradient of the relative permittivity (i.e., a progressivity of $\varepsilon_1$ according to the polar angle $\gamma$), an annular section may be subdivided into a plurality of subsections, each subsection having a filling ratio suitable for obtaining the sought for gradient.

In the same way, if it is desired to produce a lens having an axial gradient of the relative permittivity (i.e. a progressivity of $\varepsilon_1$ according to the thickness h), a section may result from the superposition of a plurality of subsections, each subsection having a filling ratio suitable for the value of the sought for relative permittivity.

Figure 5:
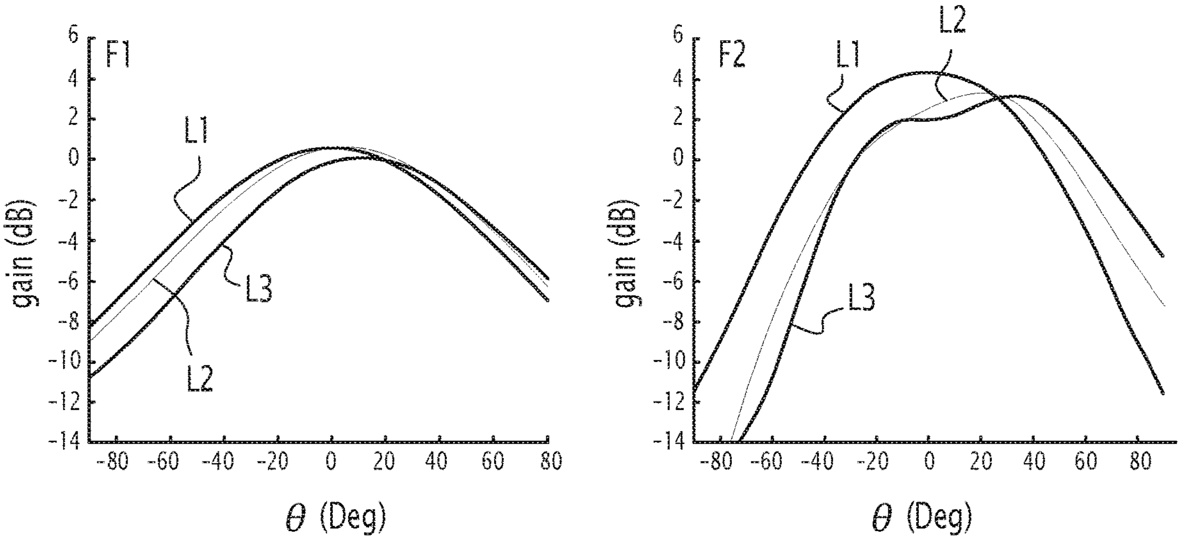
FIG. 5 represents different graphs illustrating, for different operation frequencies of the antenna shown in FIG. 1, the evolution of the gain for an antenna system which is not equipped with the lens according to the invention and an antenna system which is equipped with the lens according to the invention.

FIG. 5 shows two graphs showing the efficiency of a lens according to the invention.

To obtain such results, an antenna system like the system shown in FIG. 1 was manufactured in such a way that the lens has an aperture angle of $2\gamma_1$ 30° and a thickness $h_1$ equal to 2 mm, and that the film of adhesive has a thickness $h_1$ equal to 0.5 mm.

The graph on the left is obtained for a first frequency F1 of the frequency band of the antenna. For example, F1 is equal to twice FMIN. The graph on the right is obtained for a first frequency F2 of the frequency band of the antenna. For example, F2 is equal to six times FMIN.

Each graph illustrates, for a given frequency of the operating frequency band of the antenna of FIG. 1, the evolution of the gain (expressed in dBi) as a function of the angle $\theta$ evaluated in the ZY plane with respect to the Z axis (expressed in deg).

On each graph, the behavior of an antenna system which is not equipped with the lens according to the invention is represented by the curve L1, the behavior of an antenna system equipped with the lens according to the invention is represented by the curve L2 for a deviation $\theta_0$ of 10° and L3 for a deviation $\theta_0$ of 20°.

The graphs show an angular deviation which is stable over a broad frequency range, such that the ratio between the maximum frequency FMAX and the minimum frequency FMIN is equal to about 9.

Stable means that the angle of deviation remains constant over the entire frequency range considered with an accuracy of better than 15%, preferentially still better than 10%. It should be emphasized that the equations mentioned above are used for defining a dielectric gradient leading to a theoretical deviation angle which is strictly constant over the entire frequency range. It is indeed the practical embodiment that brings in an imprecision (approximation of the dielectric gradient by a plurality of sectors of constant permittivity, coupling effect between the lens and the antenna or the radome).

Moreover, it is shown that the purity of polarization is conserved over the entire frequency band.

The principle of the lens according to the invention may in fact be applied to other broadband antennas, such as horn antennas or Vivaldi antennas, i.e., even when the active area of near-field radiation at frequency F is not directly a function of the distance to the axis of the antenna. But structuring the lens so as to have a progressive relative permittivity from one edge of the lens to the other allows the direction of the main lobe to be tilted.

Figure 6:
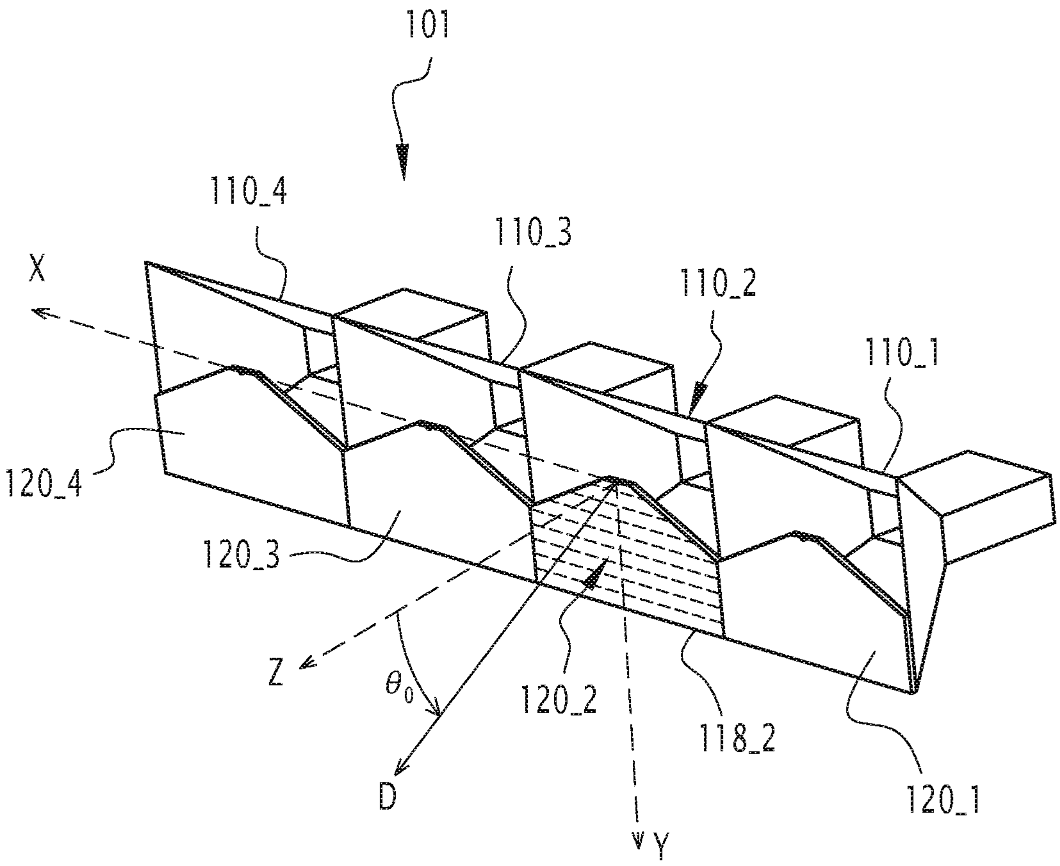
FIG. 6 is a schematic perspective view of a second embodiment of an antenna system according to the invention including a plurality of broadband horn antennas, each antenna being equipped with a lens.

FIG. 6 thereby represents a second embodiment of an antenna system according to the invention.

The antenna system 101 includes four horn antennas, 110_1, 110_2, 110_3 and 110_4, identical to each other.

The radiating end of each horn antenna has a pyramidal shape. The radiating mouth thereof is rectangular, but could in a variant take other shapes, notably a circular shape.

A coordinate frame XYZ is attached to the antenna system 101, so that the origin thereof coincides, e.g., with the center C of the radiating mouth of the second antenna 110_2.

The different horn antennas are arranged edge to edge, so as to form a row along the axis X, so that the mouths thereof lie in the common XY plane.

Each horn antenna is equipped with a lens. A lens 120_1, 120_2, 120_3 or 120_4 masks a portion of the mouth of the antenna 110_1, 110_2, 110_3 or 110_4 same equips.

A lens, e.g., the lens 120_2, forms an angular sector which covers a lower fraction of the mouth of the antenna 110_2. The angular sector extends from the geometric center C of the radiating mouth of the antenna to a lower edge 118_2 of the radiating mouth of the antenna.

The function of a lens is to deviate the D axis of the lobe of the antenna same equips by an angle $\theta_0$ with respect to the direction normal to the plane of the mouth, i.e., the Z axis. In the embodiment shown in FIG. 6, the angular deviation of the main lobe in the presence of the lens is similar for the different antennas of the system 101.

The lens 120_2 has a constant thickness and has a gradient of the relative permittivity thereof.

In the embodiment shown in FIG. 6, the gradient is oriented along the Y axis. In this figure, lines of relative iso-permittivity are shown in dotted lines. Same are arranged parallel to the lower edge 118_2.

For example, for X-band operation, the lens has a thickness of one millimeter. For example, the lens is made of ABS ESD.

For dimensioning, it is appropriate, e.g., to define the features of the lens leading to a deviation of a predefined deviation angle $\theta_0$ for an intermediate frequency of the operating frequency band of the antenna.

Then, for a frequency close to the maximum frequency FMAX, to modify the relative permittivity of a part of the lens, e.g., close to the geometric center C of the radiating plane of the antenna. Similarly, for a frequency close to the minimum frequency FMIN, to modify the relative permittivity of the other part of the lens, e.g. close to the peripheral edge of the radiating plane of the antenna.

A horn antenna is not necessarily broadband and may have a typical operating frequency band such that FMAX/FMIN is close to two.

Many variants of embodiment are conceivable.

The material of the lens may be a lossy dielectric material (complex permittivity) or lossless (real permittivity).

The dielectric material used to make the lens may have a dispersive relative permittivity as a function of frequency (i.e., the real part and/or the imaginary part depend on the frequency). In such case, it may not be necessary to vary the degree of filling or the loading of the base material in order to find a change in relative permittivity similar to the change shown in FIG. 3.

In a variant, lossy and lossless dielectric materials are combined.

It is also possible to add a magneto-dielectric material locally, the magnetic part of the material leading to an improvement in compactness depending on the thickness.

More generally, different lens parameters may be used as a degree of freedom for adapting the response of the antenna system to the needs of stability of the angular deviation of the main lobe: variation of the filling ratio of the material, use of a material with a relative permittivity that varies with the frequency, local addition of dielectric losses, etc.

The lens does not necessarily cover the entire radiating element along the radial direction, i.e., between the center of the radiating element and the periphery thereof. It may be divided into a plurality of rings spaced from one another. In this way it is possible to generate an angular deviation of the main lobe for one or a plurality of portions of the frequency band associated with the antenna used.

A plurality of lenses may be associated with the same antenna, in particular a lens placed above and a lens placed below the radiating element, the two lenses preferentially being vertically aligned with each other. As a result, there is an additional degree of freedom for adjusting the deflection angle so that same is substantially constant over the entire operating range.

In the case of the use of a protective radome, the lens may be positioned under the radome. Instead of being attached to the radiating element, the lens may then be attached to the underside of the radome, e.g., by means of a film of adhesive. In a variant, the lens is part of the radome. I.e., that during the manufacture of the radome, a portion of the radome is shaped so as to play the role of a lens. The 3D printing techniques previously envisaged may be used to produce such a radome.

The lens according to the invention is compatible with existing antenna manufacturing technologies. The addition of a lens does not require any modification of the antenna, neither in the design nor in the structure thereof. Hence the lens is a simple addition or insert to the antenna systems, in order to deflect the main lobe thereof.

The proposed solution has a relatively low cost, since it is compatible with additive manufacturing technology. Great reproducibility from one lens to another results therefrom.

But above all, the lens according to the invention has a particularly small thickness (a few millimeters at most) compatible with the integration constraints, in particular the distance between the radiating plane and the protective radome.

The proposed solution is purely passive.

The invention claimed is:

1. Antenna system comprising:

an antenna; and a device for a passive angular deflection of a main radiation lobe of said antenna, a reference frame being attached to the antenna system, the X and Y axes of the reference frame lying in a radiation plane of the antenna and the Z axis of the reference frame being normal to the radiation plane, an origin of the reference frame coinciding with a geometric center of the radiating plane of said antenna, wherein the device comprises a lens having a constant thickness and having a progressive relative permittivity between an inner edge of the lens located on an inner edge located in the vicinity of the geometrical center of said antenna and an outer edge of the lens located in the vicinity of a periphery of said antenna, a profile of the relative permittivity as a function of a distance to the geometrical center of said antenna being adapted in such a way that the lens deflects the main radiation lobe of said antenna by a predefined deflection angle over at least one portion of an operating frequency band of the antenna.

2. The antenna system according to claim 1, wherein, said antenna is a broadband antenna, the least one portion of the frequency band extends between a minimum frequency and a maximum frequency, such that the ratio between the maximum frequency and the minimum frequency is greater than six.

3. The antenna system according to claim 1, wherein, said antenna is a broadband antenna, the least one portion of the frequency band extends between a minimum frequency and a maximum frequency, such that the ratio between the maximum frequency and the minimum frequency is greater than nine.

4. The antenna system according to claim 1, wherein the at least one portion of the frequency band extends between a minimum operating frequency of said antenna and a maximum operating frequency of said antenna.

5. The antenna system according to claim 1, wherein the predefined deflection angle is constant over the at least one portion of the operating frequency band of the antenna.

6. The antenna system according to claim 1, further comprising a radome protecting said antenna and said lens from external attacks.

7. The antenna system according to claim 6, wherein said lens is attached by a film of adhesive or by screwing to said radome.

8. The antenna system according to claim 1, wherein said lens is attached by a film of adhesive or by screwing to said antenna.

9. The antenna system according to claim 1, wherein said antenna comprises:

a ground plane;

a printed circuit carrying a radiating element, the printed circuit being arranged above the ground plane; and a cavity between the ground plane and the printed circuit, said lens being arranged parallel to the radiating element, above said radiating element or below said radiating element, inside the cavity.

10. The antenna system according to claim 1, wherein said antenna is a spiral antenna, a logarithmic antenna, a log-periodic antenna, a sinuous antenna or a Vivaldi antenna.

11. The antenna system according to claim 1, wherein said antenna is a horn antenna.

12. The antenna system according to claim 1, wherein said lens has a progressive relative permittivity along a thickness thereof and/or along a polar angle thereof, the polar angle being evaluated with respect to an axis of symmetry of said lens.

13. The antenna system according to claim 1, wherein said lens is inscribed in an angular sector.

14. The antenna system according to claim 1, wherein said lens results from assembly of a plurality of elementary sections, each elementary section being characterized by a constant relative permittivity.

15. The antenna system according to claim 14, wherein a size of the patterns is adjusted so that said lens locally exhibits the desired relative permittivity.

16. The antenna system according to claim 1, wherein said lens is manufactured using an additive technique, a structure of said lens including a plurality of patterns.

17. The antenna system according to claim 16, wherein a first dielectric material is used to make the patterns and a second dielectric material is used to fill recesses in the pattern, the second dielectric material being a low-loss or lossy material.

18. The antenna system according to claim 16, wherein a size of the patterns is adjusted so that said lens locally exhibits the desired relative permittivity.

* * * * *